United States Patent
Klostermann et al.

(12)

(10) Patent No.: US 6,750,270 B1
(45) Date of Patent: Jun. 15, 2004

(54) BINDING AGENTS MODIFIED WITH NANOPARTICLES, FOR COATINGS, AND USE THEREOF

(75) Inventors: Peter Klostermann, Wuppertal (DE); Volker Rekowski, Bochum (DE); Dietrich Saatweber, Wuppertal (DE)

(73) Assignee: E. I. du Ponte de Nemours and Company, Wilmington, DE (US)

( * ) Notice: Subject to any disclaimer, the term of this patent is extended or adjusted under 35 U.S.C. 154(b) by 54 days.

(21) Appl. No.: 10/031,303

(22) PCT Filed: Jul. 11, 2000

(86) PCT No.: PCT/EP00/06552

§ 371 (c)(1),
(2), (4) Date: Jan. 15, 2002

(87) PCT Pub. No.: WO01/05897

PCT Pub. Date: Jan. 25, 2001

(30) Foreign Application Priority Data

Jul. 15, 1999 (DE) .......................................... 199 33 098

(51) Int. Cl.$^7$ ................................................ C08K 9/04

(52) U.S. Cl. ...................... 523/200; 523/201; 523/209; 525/327.2; 525/360; 525/374; 525/386

(58) Field of Search ................................. 523/200, 201, 523/209; 525/327.2, 328.2, 328.8, 329.7, 360, 374, 386

(56) References Cited

FOREIGN PATENT DOCUMENTS

| DE | 19614136 A1 | 10/1997 |
|----|-------------|---------|
| EP | 0492376 A2 | 7/1992 |
| EP | 0832947 A2 | 4/1998 |
| EP | 0832947 A | 4/1998 |
| EP | 0872500 | 10/1998 |
| JP | 08199090 A | 8/1996 |
| WO | WO 9527012 A | 10/1995 |

*Primary Examiner*—Robert Dawson
*Assistant Examiner*—D. Aylward
(74) *Attorney, Agent, or Firm*—Bart E. Lerman

(57) ABSTRACT

Nanoparticle-modified binders obtainable by reacting binders produced in the presence of nanoparticles provided with a reactive functionality, said binders having a reactive functionality complementary to the reactive functionality of the nanoparticles, with the nanoparticles, production thereof, coating compositions containing them and use thereof.

21 Claims, No Drawings

BINDING AGENTS MODIFIED WITH NANOPARTICLES, FOR COATINGS, AND USE THEREOF

This invention relates to nanoparticle-modified binders for lacquer systems, to coating compositions containing said binders and to the use thereof.

Lacquer systems containing nanoparticles are prior art. The nanoparticles impart an improved overall range of properties to the lacquer system, for example with regard to scratch resistance and resistance to solvents and chemicals. EP-A-0 832 947, for example, describes scratch-resistant clear lacquers based on a binder/crosslinking agent system and nanoparticles comprising reactive groups on the particle surface. EP-A-0 872 500 furthermore describes scratch-resistant coating compositions based on a combination of hydroxy-functional binders with nanoparticles comprising blocked isocyanate groups on the particle surface. When coating layers applied from these coating compositions are cured, the nanoparticles are chemically bonded into the coating layer.

U.S. Pat. Application No. 10/009,382 describes nanoparticle-modified binders, which are produced by reacting carboxy-functional nanoparticles with epoxy-functional binders.

Compatibility problems may arise when incorporating nanoparticles into lacquer systems. For example, prior art lacquer systems containing nanoparticles sometimes give rise to a non-homogeneous distribution of the nanoparticles in the coating layers applied from these coating compositions or achieving a homogeneous distribution of the nanoparticles in the coating compositions themselves is difficult, if not entirely impossible, from the outset.

The object arises of eliminating or largely avoiding such compatibility problems in lacquer systems containing nanoparticles.

The object may be achieved by reacting nanoparticles provided with a reactive functionality with binders which comprise a reactive functionality complementary to the reactive functionality of the nanoparticles, to give rise to nanoparticle-modified lacquer binders, wherein the binders are produced in the presence of the nanoparticles and wherein the combination of carboxyl groups as the reactive functionality of the nanoparticles and epoxy groups as the complementarily reactive functionality of the binders is excluded.

The invention accordingly provides nanoparticle-modified binders which are produced by producing binders in the presence of nanoparticles provided with a reactive functionality, which binders have a reactive functionality complementary to the reactive functionality of the nanoparticles and reacting said latter binders to give rise to nanoparticle-modified lacquer binders, wherein the combination of carboxyl groups as the reactive functionality of the nanoparticles and epoxy groups as the complementarily reactive functionality of the binders is excluded.

The invention also provides a process for the production of nanoparticle-modified binders, wherein binders are produced in the presence of nanoparticles provided with a reactive functionality, which binders have a reactive functionality complementary to the reactive functionality of the nanoparticles and said latter binders are reacted to give rise to nanoparticle-modified lacquer binders, wherein the combination of carboxyl groups as the reactive functionality of the nanoparticles and epoxy groups as the complementarily reactive functionality of the binders is excluded.

Both here and below, the reactive functionality of the nanoparticles will be designated as functional groups (A) and the reactive functionality of the binders complementary to the reactive functionality of the nanoparticles will be designated as functional groups (B).

The functional groups (A) and (B) exhibit mutually complementary reactivity, i.e. they are capable of reacting together to form a covalent bond.

The functional groups (A) and functional groups (B) comprise functional groups which are capable of reacting together by free-radical polymerisation and/or entering into addition and/or condensation reactions. Examples of addition reactions between (A) and (B) groups are ring-opening addition of an epoxy group on a carboxyl group with formation of an ester and a hydroxyl group, the addition of a hydroxyl and/or primary and/or secondary amino group onto an isocyanate group with formation of a urethane and/or urea group, the addition of a primary and/or secondary amino group and/or CH-acidic group onto an alpha,beta-unsaturated carbonyl group, in particular (meth)acryloyl group, the addition of a primary and/or secondary amino group onto an epoxy group. Examples of condensation reactions between (A) and (B) groups are the reaction of a hydroxyl and/or primary and/or secondary amino group with a blocked isocyanate group with formation of a urethane and/or urea group and elimination of the blocking agent, the reaction of a hydroxyl group with an N-methylol group with elimination of water, the reaction of a hydroxyl group with an N-methylol ether group with elimination of the etherification alcohol, the transesterification reaction of a hydroxyl group with an ester group with elimination of the esterification alcohol, the transurethanisation reaction of a hydroxyl group with a carbamate group with elimination of alcohol, the reaction of a carbamate group with an N-methylol ether group with elimination of the etherification alcohol. Examples of functional groups (A) and (B), which are capable of reacting together by free-radical polymerisation, are olefinically unsaturated groups, for example vinyl groups, allyl groups, in particular (meth)acryloyl groups.

The nanoparticles comprise conventional particles of the "nanometer" size range known to the person skilled in the art, for example with an average particle size of 5 to 200 nm, preferably of 10 to 100 nm, which contain functional groups (A) in particular on the particle surface. The nanoparticles may be of a single phase structure or a core/shell structure. Nanoparticles of a single phase structure contain functional groups (A), in particular on the particle surface. In the case of nanoparticles of a core/shell structure, the functional groups (A) are a constituent of the shell and optionally additionally of the core. The (A) equivalent weight of the nanoparticles is, for example, 250 to 3000.

The nanoparticles of a single phase structure are of an inorganic nature and are modified with functional groups (A) and optionally further organic residues. The material comprises, for example, element/oxygen networks with elements from the range aluminium, boron, titanium, zirconium and/or silicon, preferably silicon.

The nanoparticles of a single phase structure preferably comprise particulate organoaluminium, organoboron, organotitanium, organozirconium and/or organo-silicon, particularly preferably organosilicon, polymers (Ia) of the formula $(R_3SiO_{1/2})_w(R_2SiO_{2/2})_x(RSiO_{3/2})_y(SiO_{4/2})_z$, wherein y=10 to 100 mol % and the sum of w, x, y and z should amount to 100 mol %. The identical or different residues R may comprise functional groups (A) or groups convertible into functional groups (A) per se or preferably residues which bear the functional groups (A) or the groups convertible into functional groups (A). In addition to these groups, the residues may also comprise C1–C6 alkyl residues, in particular methyl residues, aryl residues, such as for example phenyl residues. Non-limiting examples of functional groups (A), which are preferably attached to silicon via a residue, are epoxy groups, carboxyl groups, hydroxyl groups, amino groups, blocked isocyanate groups, olefinically unsaturated groups, alkoxysilane groups. Functional groups (A), for example carboxyl groups, hydroxyl groups or amino groups may optionally also be present in blocked form. Examples of residues which bear functional groups (A) or groups convertible into functional groups (A) are appropriately substituted hydrocarbon residues, in particular substituted alkyl residues, for example alkenyl residues, such as for example the vinyl or allyl residue, or mercaptoalkyl, cyanoalkyl, aminoalkyl, acyloxyalkyl, such as 3-(meth)acryloyloxypropyl, glycidyl residues and hydroxyalkyl residues.

Organosilicon polymers (Ia) may be produced, for example, by a single stage emulsion polymerisation process, for example by apportioning a monomeric silane $RSi(OR')_3$ or a mixture of monomeric silanes of the type $R_aSi(OR')_{4-a}$, wherein a=0, 1, 2 or 3, to an agitated emulsifier/water mixture. The emulsion polymerisation process may also be performed in two stages, wherein the silanes reacted in the first stage of the reaction preferably have no functional groups (A) and the silanes comprising functional groups (A) are not reacted until the second stage of the process. R has the above-stated meaning. R' denotes C1–C6 alkyl residues, aryl residues or substituted hydrocarbon residues. The principle and details of the performance of such emulsion polymerisation processes are known to the person skilled in the art, for example from EP-A-0 492 376.

When producing the organosilicon polymers (Ia), the functional groups (A) are generally introduced by means of silanes comprising suitable residues R. They may, for example, also be produced by suitable reactions known to the organic chemist. This may be illustrated by means of an example which constitutes neither a restriction nor a preferred embodiment: carboxyl groups as functional groups (A) may, for example, be produced by saponifying cyanoalkyl residues or by oxidising suitable residues.

In the case of nanoparticles of a core/shell structure, the core is of an inorganic nature and is optionally modified by further organic residues. The material comprises, for example, element/oxygen networks with elements from the range aluminium, boron, titanium, zirconium and/or silicon, preferably silicon. The cores may also comprise colloidal metal oxides, with the colloidal silicon dioxide known to the person skilled in the art being preferred, for example as a powder or as a dispersion in an aqueous or other organic solvent.

The cores of nanoparticles of a core/shell structure preferably comprise organoaluminium, organoboron, organotitanium, organozirconium and/or organo-silicon, particularly preferably organosilicon, polymers (Ib) of the formula $(R''_3SiO_{1/2})_w(R''_2SiO_{2/2})_x(R''SiO_{3/2})_y(SiO_{4/2})_z$, wherein y=10 to 100 mol % and the sum of w, x, y and z should amount to 100 mol %. The identical or different residues R'' may comprise, for example, C1–C6 alkyl residues, in particular methyl residues, aryl residues, such as for example phenyl residues. Additionally or alternatively, the residues may, however, comprise functional groups (A) or groups convertible into functional groups (A) per se or preferably residues which bear the functional groups (A) or the groups convertible into functional groups (A). The explanations given in connection with the polymers (Ia) regarding the examples of (A) groups or the residues bearing (A) groups apply analogously here.

Such organosilicon polymers (Ib) may be produced, for example, by the emulsion polymerisation process, for example by apportioning a monomeric silane $R''Si(OR')_3$ or a mixture of monomeric silanes of the type $R''_aSi(OR'')_{4-a}$, wherein a=0, 1, 2 or 3, to an agitated emulsifier/water mixture. R'' has the above-stated meaning. R' denotes C1–C6 alkyl residues, aryl residues or substituted hydrocarbon residues. The principle and details of the performance of such emulsion polymerisation process are known to the person skilled in the art, for example from EP-A-0 492 376.

The statement made above in connection with the introduction of the functional groups (A) in to the organosilicon polymers (Ia) applies with regard to the introduction of the functional groups (A) into the organosilicon polymers (Ib).

In the case of nanoparticles of a core/shell structure, the cores, for example of the type (Ib), are preferably enclosed in a shell of (meth)acrylic copolymers comprising functional groups (A). The nanoparticles of a structure comprising a core and a (meth)acrylic copolymer shell with functional groups (A) are produced by performing free-radical polymerisation, for example emulsion polymerisation, for example as a grafting reaction onto the cores, of (meth) acrylically unsaturated monomers in the presence of the cores. The functional groups (A) are introduced into the (meth)acrylic copolymer shell by preferably using or admixing unsaturated monomers comprising suitable functional groups (A) during polymerisation. Examples of olefinically unsaturated monomers suitable for introducing carboxyl groups as functional groups (A) are (meth)acrylic, itaconic, crotonic, isocrotonic, aconitic, maleic and fumaric acid, semi-esters of maleic and fumaric acid as well as carboxyalkyl esters of (meth)acrylic acid, for example beta-carboxyethyl acrylate and addition products of hydroxyalkyl (meth)acrylates with carboxylic acid anhydrides, such as for example phthalic acid mono-2-(meth)acryloyloxyethyl ester. Examples of olefinically unsaturated monomers suitable for introducing hydroxyl groups as functional groups (A) are in particular hydroxyalkyl (meth)acrylates. Examples of olefinically unsaturated monomers suitable for introducing epoxy groups as functional groups (A) are (meth)allyl glycidyl ethers, 3,4-epoxy-1-vinylcyclohexane, epoxycyclohexyl (meth)acrylate, vinyl glycidyl ethers, but in particular glycidyl (meth)acrylate. The monomers comprising functional groups (A) are here generally used together with other free-radically copolymerisable, olefinically unsaturated monomers which differ therefrom. The principle and details of the performance of such free-radical polymerisations, for example emulsion polymerisations, are known to the person skilled in the art According to the invention, binders with functional groups (B) are produced in the presence of nanoparticles comprising functional groups (A). The nanoparticles comprising the functional groups (A) are here reacted with the binders comprising the functional groups (B). The reaction of the (A) groups with the (B) groups may proceed before, for example with the educts used to produce the binders comprising the functional groups (B), and/or during and/or after synthesis of the binders comprising the functional groups (B). The educts used in the production of the binders comprising the functional groups (B) comprise binder building blocks which, in addition to one or more groups (B) or groups convertible into groups (B), may contain functional groups which differ from groups (B). Synthesis of the binders comprising the functional groups (B) from the educts may here result in the (B) groups or groups convertible into (B) groups of the educts being partially consumed.

There are no restrictions with regard to the binders bearing functional groups (B) suitable for reaction with nanoparticles comprising functional groups (A). They may, for example, comprise polyester, polyurethanes, (meth) acrylic copolymers and other polymers comprising functional groups (B). The polymers comprising functional groups (B) have at least one, preferably at least two functional groups (B) per molecule, corresponding to a calculated (B) equivalent weight of, for example, 150 to 2000, relative to solid resin. Number average molar mass (Mn) is preferably 200 to 10000.

Production of the binders comprising functional groups (B), for example polyesters, polyurethanes, (meth)acrylic copolymers, is sufficiently well known to the person skilled in the art and requires no explanation.

Non-limiting examples of functional groups (B) are epoxy groups, carboxyl groups, hydroxyl groups, amino groups, isocyanate groups, olefinically unsaturated groups, alkoxysilane groups. Functional groups (B), for example carboxyl groups, hydroxyl groups, isocyanate groups or amino groups, may optionally also be present in blocked form.

The nanoparticles comprising functional groups (A) are reacted with binders comprising functional groups (B), for example in a ratio by weight of 5–30 wt. % of nanoparticles to 70–95 wt. % of binder or binder building blocks used to synthesise the binder, to give rise to the binders according to the invention. The weight percentages relate in each case to solids content. The functional groups (A) of the nanoparticles may here, for example, be present in a ratio to the functional groups (B) of the binders of 10:1 to 1:100. The reaction may here proceed with partial or complete consumption of the functional groups (A) of the nanoparticles and/or of the functional groups (B) of the binders. The reaction may, for example, be performed at elevated temperatures, for example 80 to 160° C., optionally with catalysis. The binders are produced in the presence of the nanoparticles, wherein the reaction of the functional groups (A) and (B) may proceed before, during and/or after the actual synthesis of the binder. The reaction may here be performed without solvents or preferably in the presence of organic solvents.

In addition to the groups, themselves optionally reactive, such as for example ester groups, urethane groups, siloxane groups, urea groups, hydroxyl groups, arising from the reaction of (A) and (B), the binders according to the invention may contain one or more further functional groups. These further functional groups may, for example, be groups (A) and/or (B) which were present in excess and/or were unreacted and/or they may comprise other functional groups. The further functional groups may originate from the nanoparticles and/or from the binders reacted therewith or they may be introduced after the production of the binders according to the invention. Examples of further functional groups of the binders are hydroxyl groups, olefinically unsaturated groups, for example (meth)acryloyl groups, epoxy groups, carboxyl groups, amino groups, alkoxysilane groups.

The nanoparticle-modified binders according to the invention may be used per se as coating compositions, but are preferably used as coating compositions after mixing with other constituents. The present invention accordingly also relates to coating compositions which contain the nanoparticle-modified binders according to the invention. The coating compositions may comprise thermoplastic, but preferably thermosetting, intrinsically or extrinsically crosslinking coating compositions.

Thermoplastic coating composition contain no crosslinking agents and they are also not intrinsically crosslinking. They comprise, for example, physically drying coating compositions.

Thermosetting coating compositions are preferably produced from the binders according to the invention. In this case, the binders according to the invention are those which comprise one or more reactive functionalities which provide the basis for chemical crosslinkability. The binders may be intrinsically or extrinsically crosslinking. In the latter case, the coating compositions contain crosslinking agents in addition to the nanoparticle-modified lacquer binders according to the invention.

The crosslinking agents are selected on the basis of the functional groups present in the nanoparticle-modified lacquer binders, i.e. the crosslinking agents are selected such that they comprise a reactive functionality complementary to the functionality of the binders according to the invention, wherein the functional groups may react together by free-radical polymerisation and/or enter into addition and/or condensation reactions. Examples of addition and condensation reactions which may be mentioned are the same as were listed above as examples of addition and condensation reactions which are possible between functional groups (A) and (B). Subject to mutual compatibility, two or more complementary functionalities may simultaneously be present in a coating composition curable by addition and/or condensation reactions, such that two or more of the different types of reaction stated above by way of example may occur during curing.

Coating compositions which crosslink extrinsically by free-radical polymerisation may comprise thermally or photochemically initiated, free-radically polymerisable coating compositions. These contain nanoparticle-modified binders according to the invention comprising free-radically polymerisable, olefinically unsaturated groups optionally together with further free-radically copolymerisable components. Examples of such components are prepolymers, such as polymers or oligomers, the molecules of which comprise free-radically polymerisable olefinic double bonds, in particular (meth)acryloyl groups, for example (meth)acrylic-functional (meth)acrylic copolymers epoxy resin (meth) acrylates, polyester (meth)acrylates, polyether (meth) acrylates, polyurethane (meth)acrylates, unsaturated polyesters, unsaturated polyurethanes or silicone (meth) acrylates, for example having number average molecular masses (Mn) preferably in the range from 200 to 10000, particularly preferably from 500 to 3000 and, for example, comprising on average 2 to 20, preferably 3 to 10 free-radically polymerisable, olefinic double bonds per molecule. Reactive diluents, i.e. reactive monomers, may likewise be present, such as for example (meth)acrylic acid and the esters thereof, maleic acid and the semi-esters thereof, vinyl acetate, vinyl ethers, substituted vinylureas, ethylene and propylene glycol di(meth)acrylate, 1,3- and 1,4-butanediol di(meth)acrylate, vinyl (meth)acrylate, allyl (meth)acrylate, glycerol tri-, di- and mono(meth)acrylate, trimethylolpropane tri-, di- and mono(meth)acrylate, styrene, vinyltoluene, divinylbenzene, pentaerythritol tri- and tetra(meth)acrylate, di- and tripropylene glycol di(meth)acrylate, hexanediol di(meth)acrylate. The free-radically curing systems may contain photoinitiators or thermal free-radical initiators.

The coating compositions curable by addition and/or condensation reaction may comprise single or multicomponent lacquer systems.

Examples of preferred single or two-component lacquer systems are those which contain hydroxy-functional (meth) acrylic copolymers, polyester resins and/or polyurethane resins as nanoparticle-modified binders and triazine-based components which crosslink with the hydroxyl groups of the binder with formation of ether and/or ester groups, for example tris(alkoxycarbonylamino)triazine, aminoplastic resins, in particular melamine resins and/or transesterification crosslinking agents and/or free or blocked polyisocyanates as crosslinking agents. Further preferred single or two-component lacquer systems are those which contain epoxy-functional nanoparticle-modified binders, in particular epoxy-functional, nanoparticle-modified (meth)acrylic copolymers in combination with carboxy-functional crosslinking agents. The crosslinking agents are known to the person skilled in the art and require no further explanation.

Apart from the nanoparticle-modified binders, the coating compositions according to the invention may contain further conventional lacquer binders, optionally provided with reactive groups, in particular with the same reactive groups as the nanoparticle-modified binders.

For example, the coating compositions according to the invention have a ratio of solids content by weight, which amounts to 100 wt. % in total, of 60–100 wt. % of nanoparticle-modified binders to 0–40 wt. % of crosslinking agents to 0–40 wt. % of further binders.

The coating compositions according to the invention may contain pigments and/or extenders as well as conventional lacquer additives in quantities conventional in lacquers.

The coating compositions according to the invention may be formulated without solvents or they contain organic solvents conventional in lacquers and/or water. Aqueous compositions may, for example, assume emulsion form. In this case, the emulsified state may be achieved by adding external emulsifiers or the systems are of the type which contain groups having a self-emulsifying action in water, for example ionic groups.

The coating compositions according to the invention may be used to produce any desired coating layer, for example for the production of primer, basecoat, surfacer, topcoat, clear lacquer layers. They may be applied using conventional application methods onto any desired substrates, for example of metal, plastics, wood, glass. Examples of application methods are brushing, roller coating, knife coating, dipping, but in particular spraying. Once applied and after an optional flashing-off or melting phase, the coating layers applied from the coating compositions according to the invention are dried or cured. Depending upon the composition of the coating compositions according to the invention, this may proceed at room temperature or be forced at elevated temperatures, for example of 40 to 80° C., or by stoving at higher temperatures, for example of 80 to 220° C. In the case of radiation-curable coating compositions according to the invention, curing is performed by exposure to high-energy radiation, for example UV radiation.

The nanoparticle-modified binders according to the invention exhibit no compatibility problems between the nanoparticles and further binder or coating composition constituents whether during production and storage, during incorporation into coating compositions or during application of the coating compositions. The binders and coating compositions are stable in storage. The coating layers applied from the coating compositions according to the invention have, for example, good surface properties, in particular for example elevated resistance to scratching and to chemicals.

EXAMPLE 1

400 g of propylene carbonate were heated to 80° C. and, over 4 hours, a mixture prepared from 278 g of Highlink OG 100-31 from Clariant (30 wt. % suspension of $SiO_2$ nanoparticles modified with olefinically unsaturated groups and with a particle size of 13 nm in hydroxyethyl methacrylate), 240 g of isobutyl methacrylate, 46 g of isobutyl acrylate, 12 g of acrylic acid and 24 g of azobisisobutyronitile was added dropwise. Post-polymerisation was performed for a further 4 hours.

EXAMPLE 2

400 g of propylene carbonate were heated to 80° C. and, over 4 hours, a mixture prepared from 194.6 g of hydroxyethyl methacrylate, 310 g of isobutyl acrylate, 59.4 g of isobutyl acrylate, 12 g of acrylic acid and 24 g of azobisisobutyronitile was added dropwise. Post-polymerisation was performed for a further 4 hours.

EXAMPLE 3

Production of a Basecoat/clear Lacquer Two Layer Lacquer Coating:

A black aqueous basecoat lacquer was sprayed to a dry film thickness of 15 μm onto conventional phosphated bodywork sheet metal which had already been coated by cathodic electrocoating and with surfacer. After application, the coating was predried for 5 minutes at 80° C. The coating was then overcoated to a dry film thickness of 35 μm with a clear lacquer of the following composition and stoved for 20 minutes at 140° C. (object temperature).

The clear lacquer (DIN4 spraying viscosity of 30 seconds at 20° C.) was produced by combining 112 g of the resin solution obtained in Example 1 with 98 g of butyl acetate and then mixing with 36 g of a 90 wt. % HDI isocyanurate polyisocyanate solution in butyl acetate/Solvesso 100.

EXAMPLE 4

Production of a Basecoat/clear Lacquer Two Layer Lacquer Coating:

Example 3 was repeated, with the exception that the clear lacquer (DIN4 spraying viscosity of 30 seconds at 20° C.) was produced by mixing 112 g of the resin solution obtained in Example 2 with 79 g of butyl acetate and then mixing with 36 g of a 90 wt. % HDI isocyanurate polyisocyanate solution in butyl acetate/Solvesso 100.

The scratch resistance of the lacquer coatings obtained in Examples 3 and 4 was determined by measuring residual gloss after wash-scratching (Example 3, residual gloss 76%; Example 4, residual gloss 58%).

Residual gloss was measured in % (ratio of initial gloss (20°) of the lacquer coating to the gloss after wash-scratching, gloss measurement in each case performed at an illumination angle of 20°). Wash-scratching was performed using the laboratory washing line from Amtec Kistler (c.f. Th. Klimmasch & Th. Engbert, *Entwicklung einer einheitlichen Laborprüfmethode für die Beurteilung der Waschstraßgenbeständigkeit von Automobil-Decklacken,* in DFO proceedings 32, pp. 59–66, Technologie-Tage, proceedings of the seminar on Apr. 29–30, 1997 in Cologne, published by Deutsche Forschungsgesellschaft für Oberflächenbehandlung e.V., Aderstraße 94, 40215 Düsseldorf).

What is claimed is:

1. A nanoparticle-modified binder comprising at least one nanoparticle having a reactive functionality and at least one binder having a reactive functionality complementary to the reactive functionality of the at least one nanoparticle, said at least one nanoparticle being covalently bound to the at least one binder; wherein the at least one binder is synthesized from at least one binder educt in the presence of the at least one nanoparticle; and further wherein a combination of carboxyl groups as the reactive functionality of the at least one nanoparticle and epoxy groups as the complementary reactive functionality of the at least one binder is excluded.

2. The nanoparticle-modified binder according to claim 1, wherein the reactive functionality of the at least one nanoparticle comprises at least one functional group (A); and wherein the complementary functionality of the at least one binder comprises at least one functional group (B).

3. The nanoparticle-modified binder according to claim 2, wherein the at least one functional group (A) is selected from the group consisting of epoxy groups, carboxyl groups, hydroxyl groups, amino groups, isocyanate groups, olefinically unsaturated groups and alkoxysilane groups.

4. The nanoparticle-modified binder according to claim 2, wherein the at least one functional group (B) is selected from the group consisting of epoxy groups, carboxyl groups, hydroxyl groups, amino groups, isocyanate groups, olefinically unsaturated groups and alkoxysilane groups.

5. The nanoparticle-modified binder according to claim 2, wherein functional groups (A) and (B) are capable of reacting together by a mechanism selected from the group consisting of free-radical polymerization, addition reactions and condensation reactions.

6. The nanoparticle-modified binder according to claim 1, wherein the at least one nanoparticle has an average particle size of 5 to 200 nm having at least one functional group (A) on the particle surface.

7. The nanoparticle-modified binder according to claim 1, wherein the at least one nanoparticle is selected from the group consisting of a single phase structure nanoparticle modified with at least one functional group (A) and a core/shell structure nanoparticle.

8. The nanoparticle-modified binder according to claim 7, wherein the single phase structure comprises at least one element/oxygen network, wherein the element is selected from the group consisting of aluminum, boron, titanium, zirconium, silicon and combinations thereof.

9. The nanoparticle-modified binder according to claim 8, wherein the single phase structure nanoparticle comprises particulate organoaluminum, organoboron, organotitanium, organozirconium, organo-silicon and combinations thereof.

10. The nanoparticle-modified binder according to claim 7, wherein the core/shell structure comprises at least one element/oxygen network, wherein the element is selected from the group consisting of aluminum, boron, titanium, zirconium, silicon and combinations thereof.

11. The nanoparticle-modified binder according to claim 10, wherein the core/shell structure nanoparticle comprises organoaluminum, organoboron, organotitanium, organozirconium, organo-silicon and combinations thereof.

12. The nanoparticle-modified binder according to claim 7, wherein the shell comprises (meth)acrylic copolymers containing at least one functional group (A).

13. The nanoparticle-modified binder according to claim 1, further comprising at least one functional group selected from the group consisting of hydroxyl groups, olefinically unsaturated groups, carboxyl groups, epoxy groups, amino groups, and alkoxysilane groups.

14. A process for producing a nanoparticle-modified binder comprising synthesizing at least one binder having a reactive functionality from at least one binder educt, wherein the at least one binder is produced in the presence of at least one nanoparticle having a reactive functionality; reacting the at least one nanoparticle with the at least one binder, said reactive functionality of the at least one binder being complementary to the reactive functionality of the at least one nanoparticle, wherein said at least one nanoparticle is covalently bound to the at least one binder, and further wherein a combination of carboxyl groups as the reactive functionality of the at least one nanoparticle and epoxy groups as the complementary reactive functionality of the at least one binder is excluded.

15. The nanoparticle-modified binder according to claim 14, wherein the reactive functionality of the at least one nanoparticle comprises at least one functional group (A); and wherein the complementary functionality of the at least one binder comprises at least one functional group (B).

16. The nanoparticle-modified binder according to claim 15, wherein the at least one functional group (A) is selected from the group consisting of epoxy groups, carboxyl groups, hydroxyl groups, amino groups, isocyanate groups, olefinically unsaturated groups and alkoxysilane groups.

17. The nanoparticle-modified binder according to claim 15, wherein the at least one functional group (B) is selected from the group consisting of epoxy groups, carboxyl groups, hydroxyl groups, amino groups, isocyanate groups, olefinically unsaturated groups and alkoxysilane groups.

18. A coating composition containing the nanoparticle-modified binder according to claim 1.

19. The coating composition according to claim 18, further comprising at least one conventional lacquer binder.

20. The coating composition according to claim 18, further comprising a member of the group consisting of pigments, extenders and conventional lacquer additives.

21. A coating composition comprising
A) a nanoparticle-modified binder comprising at least one nanoparticle having a reactive functionality and at least one binder having a reactive functionality complementary to the reactive functionality of the at least one nanoparticle, wherein a combination of carboxyl groups as the reactive functionality of the at least one nanoparticle and epoxy groups as the complementary reactive functionality of the at least one binder is excluded; and
B) at least one conventional lacquer binder.

* * * * *

UNITED STATES PATENT AND TRADEMARK OFFICE
CERTIFICATE OF CORRECTION

PATENT NO.    : 6,750,270 B1
DATED         : June 15, 2004
INVENTOR(S)   : Peter Klostermann, Volker Rekowski and Dietrich Saatweber It is certified that error appears in the above-identified patent and that said Letters Patent is hereby corrected as shown below:

Column 4,
Line 4, the "(OR")" in the formula should be replaced by -- (OR') --
Line 12, "in to" to be replaced by -- into --

Signed and Sealed this

Third Day of August, 2004

JON W. DUDAS
*Acting Director of the United States Patent and Trademark Office*